United States Patent
Hamill

(10) Patent No.: US 12,328,340 B2
(45) Date of Patent: Jun. 10, 2025

(54) METHOD FOR IMPROVING IT SECURITY IN A NETWORK

(71) Applicant: Sentinel Forge Technologies LLC, Towson, MD (US)

(72) Inventor: Colin Hamill, Towson, MD (US)

(73) Assignee: Sentinel Forge Technologies LLC, Towson, MD (US)

( * ) Notice: Subject to any disclaimer, the term of this patent is extended or adjusted under 35 U.S.C. 154(b) by 220 days.

(21) Appl. No.: 18/061,677

(22) Filed: Dec. 5, 2022

(65) Prior Publication Data

US 2023/0231880 A1    Jul. 20, 2023

Related U.S. Application Data

(60) Provisional application No. 63/285,645, filed on Dec. 3, 2021.

(51) Int. Cl.
*H04L 9/40*    (2022.01)

(52) U.S. Cl.
CPC ...... *H04L 63/1491* (2013.01); *H04L 63/1416* (2013.01); *H04L 63/1425* (2013.01)

(58) Field of Classification Search
CPC ............. H04L 63/1491; H04L 63/1416; H04L 63/1425
See application file for complete search history.

(56) References Cited

U.S. PATENT DOCUMENTS

| | | | |
|---|---|---|---|
| 8,549,643 B1 | 10/2013 | Shou | |
| 9,152,808 B1 * | 10/2015 | Ramalingam | G06F 21/62 |
| 10,102,056 B1 * | 10/2018 | Goldberg | G06F 9/45558 |
| 10,574,698 B1 * | 2/2020 | Sharifi Mehr | H04L 63/1491 |
| 10,897,472 B1 * | 1/2021 | Viglione | H04L 63/1491 |
| 2016/0323316 A1 | 11/2016 | Kolton et al. | |
| 2021/0352104 A1 * | 11/2021 | Sampat | H04L 63/0236 |

OTHER PUBLICATIONS

International Search Report issued in co-pending International Application No. PCT/US2022/080919 on Apr. 24, 2023.

* cited by examiner

*Primary Examiner* — Viet D Vu
(74) *Attorney, Agent, or Firm* — Whiteford, Taylor & Preston, LLP; Peter J. Davis

(57) ABSTRACT

Method and apparatus for protecting computer resources from malicious attack including baseline sentinels and warrior sentinels. Baseline sentinels are deployed on a network serving only as decoys and containing no company data. When any attempt to communicate with a baseline sentinel is detected, a host of warrior sentinels (also containing no company data) are deployed to act as additional decoys, diminishing the chance that a malicious attack will reach a valuable computer resource and collecting information on the malicious attacker. Once the malicious attack stops or is defeated, the warrior sentinels are retired and the system resets to baseline sentinels.

4 Claims, 12 Drawing Sheets

METHOD FOR IMPROVING IT SECURITY IN A NETWORK

BACKGROUND OF THE INVENTION

Field of the Invention

The present invention relates to computer security for protecting individuals & organizations from Ransomware/cyberattacks.

Description of the Background

It is becoming increasingly difficult for individuals & organizations to protect themselves from malicious cyberattacks. A major challenge in modern IT security is that the attackers continue to develop new tools & methods for defeating traditional IT security, and the defenders are always reacting to the actions of the attacker. Once an attacker has successfully penetrated a defender's IT environment, they are able to spend weeks, months, or even years preparing for their cyber-attack. The time that the final cyberattack is determined by the attacker, and the defender will not typically have the ability to stop the attack once it has begun.

Defenders are being forced to play an unfair game, where the attacker possesses all of the initiative and advantages and need a way to change the "rules" so that they can actually defeat the attacker.

SUMMARY OF THE INVENTION

Accordingly, there is provided according to the invention a method for improving IT security in a computer network, comprising: Installing on a computer network a first Sentinel Node; Deploying from said first Sentinel Node a first Sentinel virtual decoy onto said computer network; Configuring said first Sentinel virtual decoy so that there is no legitimate reason for a computer, user, or device to communicate with said first Sentinel virtual decoy; Capturing from said first Sentinel virtual decoy, from said first Sentinel Node, a first baseline configuration of said first Sentinel virtual decoy; Monitoring said first Sentinel virtual decoy and said computer network, by said first Sentinel Node, for any attempts by computers, users, or devices connected to said computer network, to communicate with said first Sentinel virtual decoy; Detecting by said first Sentinel Node an attempt to communicate with said first Sentinel virtual decoy; Transmitting an alert message to at least one designated individual on said attempt to communicate with said first Sentinel virtual decoy; Capturing from said first Sentinel virtual decoy, from said first Sentinel Node, a second baseline configuration of said first Sentinel virtual decoy; Comparing said second baseline configuration of said first Sentinel virtual decoy to the first baseline configuration to measure any differences; Deploying a plurality of Warrior Sentinel virtual decoys from said Sentinel Node onto said computer network; Configuring said plurality of Warrior Sentinel virtual decoys so that there is no legitimate reason for a computer, user, or device to communicate with said plurality of Warrior Sentinel virtual decoys; Capturing from said plurality of Warrior Sentinel virtual decoys, from said first Sentinel Node, a first baseline configuration for each of said plurality of Warrior Sentinel virtual decoys; Monitoring said plurality of Warrior Sentinel virtual decoys and said computer network, by said first Sentinel Node, for any attempts by computers, users, or devices connected to said computer network, to communicate with any one or more of said plurality of Warrior Sentinel virtual decoys; Detecting by said first Sentinel Node an attempt to communicate with said one or more of said plurality of Warrior Sentinel virtual decoys; Capturing from said one or more of said plurality of Warrior Sentinel virtual decoys, from said first Sentinel Node, a second baseline configuration of said one or more of said plurality of Warrior Sentinel virtual decoys; Analyzing the changes to the first and second baseline configurations to identify the nature of malicious activity.

There is further provided a method, wherein when said first Sentinel Node detects, after a predetermined time period, no additional attempts to communicate with said first Sentinel virtual decoy or with one or more of said plurality of Warrior Sentinel virtual decoys, removing by said first Sentinel Node one or more of said plurality of Warrior Sentinel virtual decoys, from said computer network. There is further provided a method further comprising Transmitting the analysis of the detected malicious activity with other Sentinel Deployments.

And there is further provided a method wherein each said Sentinel virtual decoy and each said Warrior Sentinel virtual decoy is based on a Sentinel template which Sentinel template is based on information gathered from said computer network, including devices, accounts, software, and users connected to said computer network so that same Sentinel template, said Sentinel virtual decoys and said Warrior Sentinel virtual decoys appear to devices outside said computer network to be operating assets of said computer network.

According to another embodiment of the invention, there is provided an apparatus comprising: a computer device installed on a computer network, said computer device comprising a processor and non-transitory storage media, said non-transitory storage media containing machine-readable instructions, which when executed by the processor, cause the computer device to: Deploy a first Sentinel virtual decoy onto said computer network; Configure said first Sentinel virtual decoy so that there is no legitimate reason for a computer, user, or device to communicate with said first Sentinel virtual decoy; Capture from said first Sentinel virtual decoy, a first baseline configuration of said first Sentinel virtual decoy; Monitor said first Sentinel virtual decoy and said computer network, for any attempts by computers, users, or devices connected to said computer network, to communicate with said first Sentinel virtual decoy; Detect an attempt to communicate with said first Sentinel virtual decoy; Transmit an alert message to at least one designated individual on said attempt to communicate with said first Sentinel virtual decoy; Capture from said first Sentinel virtual decoy a second baseline configuration of said first Sentinel virtual decoy; Compare said second baseline configuration of said first Sentinel virtual decoy to the first baseline configuration to measure any differences; Deploy a plurality of Warrior Sentinel virtual decoys onto said computer network; Configure said plurality of Warrior Sentinel virtual decoys so that there is no legitimate reason for a computer, user, or device to communicate with said plurality of Warrior Sentinel virtual decoys; Capture from said plurality of Warrior Sentinel virtual decoys a first baseline configuration for each of said plurality of Warrior Sentinel virtual decoys; Monitor said plurality of Warrior Sentinel virtual decoys and said computer network for any attempts by computers, users, or devices connected to said computer network, to communicate with any one or more of said plurality of Warrior Sentinel virtual decoys; Detect an attempt to communicate with said one or more of said plurality of Warrior Sentinel virtual decoys; Capture from said one or more of said plurality of Warrior Sentinel virtual decoys a second baseline configuration of said one or more of said plurality of Warrior Sentinel virtual decoys; Analyze the changes to the first and second baseline configurations to identify the nature of malicious activity.

Figure 1:
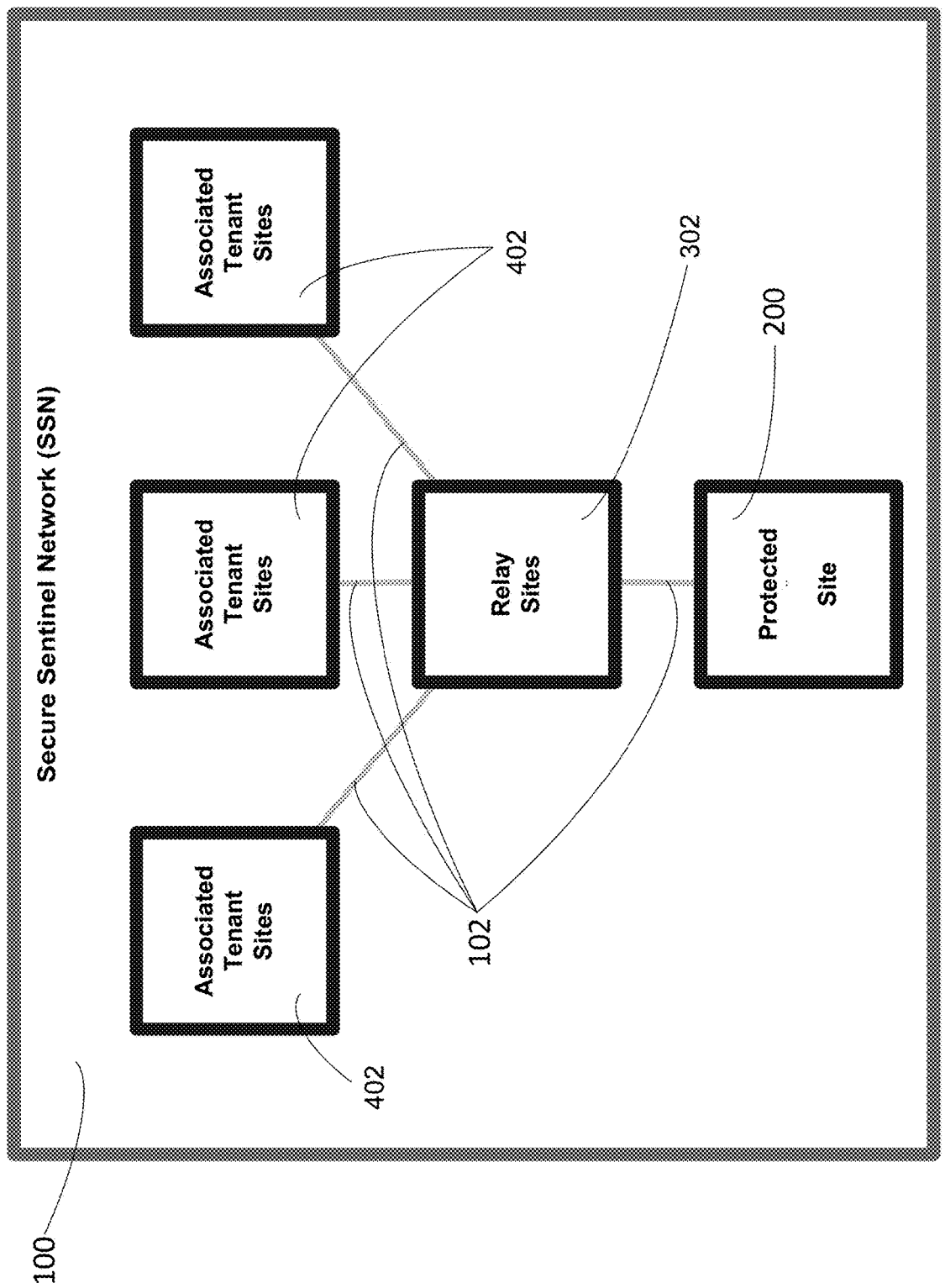
FIG. 1 is a logical hierarchical view of the overall platform architecture and connectivity between the different Protected Sites of the Secure Sentinel Network (SSN) according to an embodiment of the invention.

Features in the attached drawings are numbered with the following reference numerals:

100 Secure Sentinel Network (SSN)
102 Wide Area Network (WAN) Connection - "Internet Connection"
200 Protected Site
202 Local Networking Equipment
204 Local Server Hardware
206 Local Computer Equipment
208 Local Software Applications
210 Local Area Network (LAN) Connection/ "Network Connection"
212 Internet
216 IT Infrastructure
218 Important Data
300 Protected Central Site
302 Relay Sites
304 Adversary Signatures Database
306 Signature Distribution Traffic
400 Protected Relay Site
402 Associated Tenant Sites
500 Protected Tenant Site
502 Associated Relay Site
600 Sentinel Deployment
610 Hardware Components
612 Computer Resources
614 All Flash Storage
616 Networking Hardware
620 Software Modules
622 Hardware Virtualization Software
624 Management Software
626 Backup Software
628 Monitoring Software
630 Analytics Software
632 Communication Software
640 Baseline Sentinels
642 Sentinel
700 Sentinel Storage Repository
702 Log Data Storage Repository
704 Backup Storage Repository
706 Analytics Storage Repository
800 Backup Job
802 Adversary Analytics Data
900 Active Sentinel Deployment
902 Warrior Sentinels
904 Tripped Sentinel
906 Defender
908 Adversary
910 Malicious Workload
912 Malicious Behavior/Cyberattack
914 Adversary Attack Data

DETAILED DESCRIPTION

The Secure Sentinel Network (SSN) 100 is a Ransomware Protection & Recovery platform architecture, which consists of multiple different building blocks configured to work together.

In this document, there will be references to two different types of individuals: the Adversary 908 and the Defender 906. These two groups of individuals are defined as follows:

Adversaries 908—These are internal or external malicious actors that seek to gain access to the IT Infrastructure 216 of individuals or organizations with the motive of destroying, modifying, or stealing Important Data 218, or to render their targets' IT Infrastructure 216 unusable for authorized network users. The malicious actions & activities of Adversaries 908 will be referred to as Cyberattacks 912.

Defenders 906—These are individuals or organizations that leverage Local IT Infrastructure 616, connected to the Internet 212, that would be negatively impacted by a successful Cyberattack 912 by a potential Adversary 908.

As shown in FIG. 1 the SSN 100 consists of multiple Protected Sites 200, each with a Wide Area Network (WAN) Connection 102 to the Internet 212. A Protected Site 200 is defined as any locations where the Defender 906 has deployed IT Infrastructure 216 and/or Important Data 218 that must be protected from potential Adversaries 908. Any & all of the Defender's physical ("On-premises") locations and their hosted/co-location environments ("The Cloud") can be designated as a Protected Site 200. The determinations of what is or is not a Protected Site 200 and what is or is not Important Data 218 are the sole discretion of the Defender 906.

The following section will describe the various components that are found in all three types of Protected Sites 200 in the SSN 100 platform, how they work together, and the way that they are deployed and configured to protect the Defender 906 from a potential Adversary's 908 Cyberattacks 912 on their Protected Sites 200.

Figure 2:
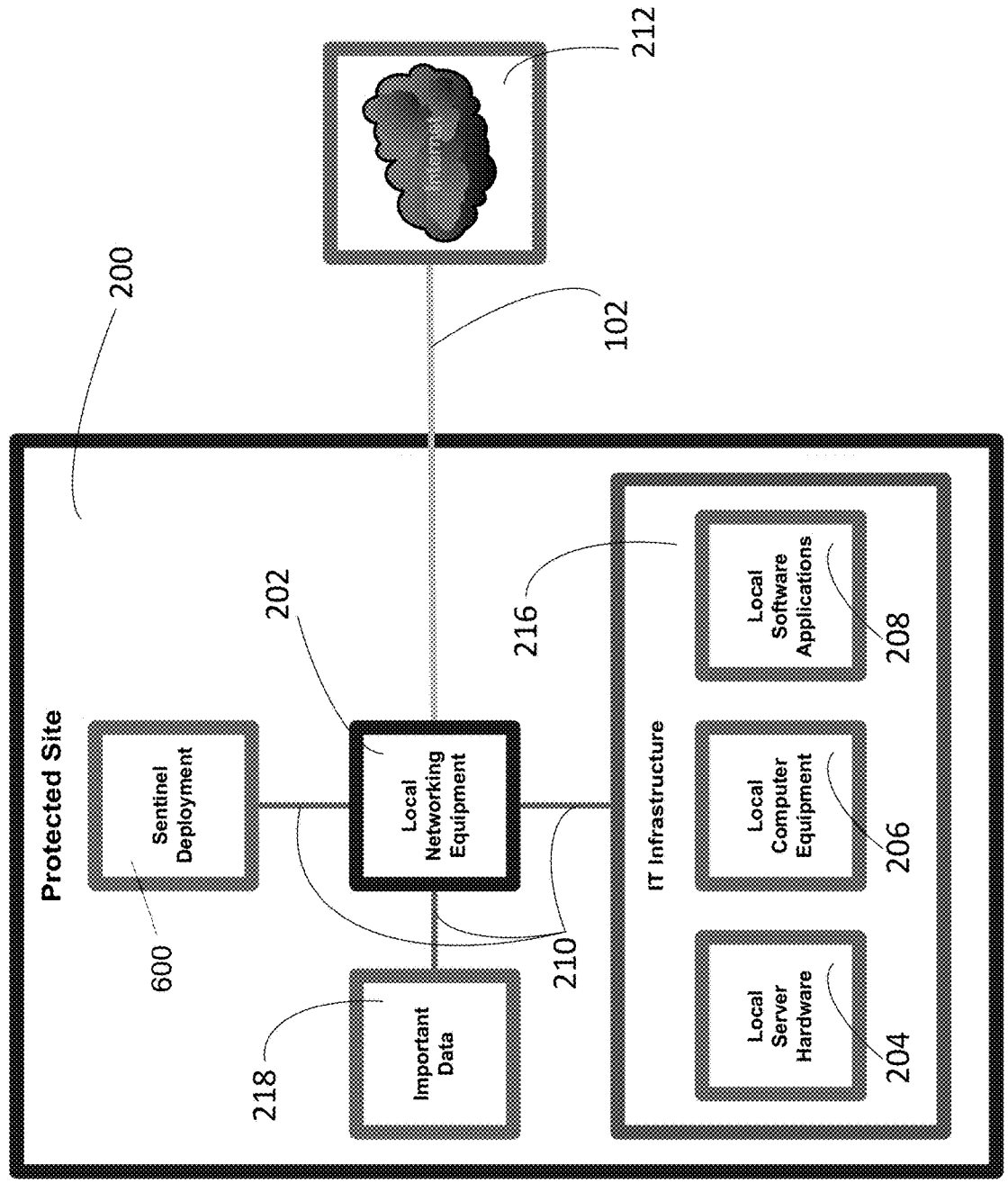
FIG. 2 is a logical view of a Protected Site and Local IT Infrastructure according to an embodiment of the invention.

As shown on FIG. 2, each Protected Site 200 will contain the following components:

Local Networking Equipment 202—These are devices deployed at a given Protected Site which are required for communication and interaction between devices on a computer network. Some potential examples of these types of devices would be Routers, Switches, Firewalls, Wireless Access Points, and Hubs.

Local Server Hardware 204+Local Computer Equipment 206+Local Software Applications 208—These refers to the Defender's 906 physical IT infrastructure deployed at a given Protected Site 200, as well as their software applications and associated data, which all have network connections 210 to the Protected Site's Local Networking Equipment 202. These components will collectively be referred to as IT Infrastructure 216.

Important Data 218—This refers to any digital data at a given site that the Defender 906 considers important or valuable and wants it to be protected from a potential Adversary's 908 Cyberattacks 912 or from being stolen.

Figure 6:
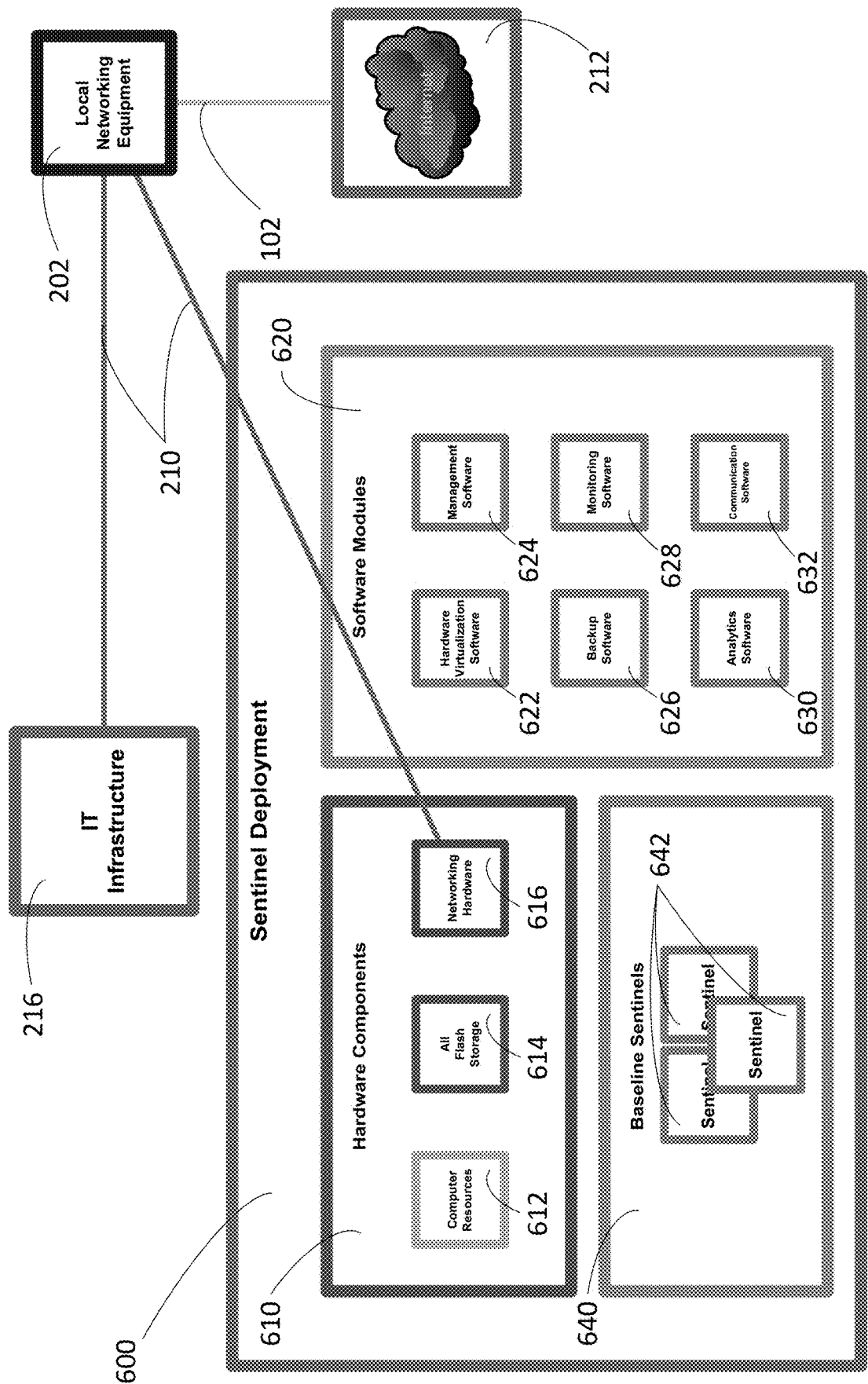
FIG. 6 is a logical view of a Sentinel Deployment shown in FIG. 2 according to an embodiment of the invention. This Sentinel Deployment is a representation of its normal operating state with Baseline Sentinels deployed.

Sentinel Deployment 600—FIG. 6 shows a depiction of the high-level architecture of a Sentinel Deployment 600, which is the foundational building block of the SSN 100 platform. The different components of a Sentinel Deployment 600 will have network connections 210 to the Protected Site's Local Networking Equipment 202. Each Sentinel Deployment 600 will support a robust network of high-touch active deception artifacts/traps, referred to as Sentinels 642, which are defined as follows:

Sentinels 642—Physical or virtual computer devices deployed at a Protected Site 200 and that act as decoys/traps for any potential Adversary 908 that might attempt to interact with a given Protected Site 200. "Interact with" refers to an attempt to scan, communicate with, modify, or to have a deployed Sentinel 642 be the target of any computer process; all of these behaviors would be defined by the Defender 906 as Malicious Activities 912. Some examples of potential Sentinels 642 would be Decoy Systems (simulating various computer, servers, network devices, network connected televisions, mobile devices, household devices, etc), Decoy Accounts (simulating different users, administrators, etc), and Decoy Files (simulating files/documents/spreadsheets, databases, etc., containing financial information, intellectual property information, social security numbers, credit card numbers, etc). Any network asset, such as hardware, software or data can be represented by an attractive decoy. Each Sentinel 642 may be configured based on a Sentinel Decoy Template. The Sentinel Decoy Template is a list of features and instructions that the system uses to build each Sentinel to ensure that each Sentinel represents (but is a decoy for) a typical device, account or file on the protected network. The information required to build a particular system's Sentinel Decoy Template is based on information gathered from the protected network and the nodes thereon.

The quantity of Sentinels 642 initially deployed and running at a given Protected Site 200 will be determined by the current IT security posture of the Defender 906. Those initially deployed and running Sentinels 642 will be referred to collectively as the Baseline Sentinels 640. As a rule, larger Protected Sites 200 will require a larger number of deployed Baseline Sentinels 640 to maximize the odds of a potential Adversary 908 interacting with a deployed Sentinel 642 and targeting it with Malicious Activity 912. There is no upper limit on the number of Baseline Sentinels 642 that can be deployed at a given Protected Site 200 and no upper limit on the amount of hardware resources that the Defender 906 can allocate to support the deployed Baseline Sentinels 640 in the Sentinel Deployment 600.

Figure 3:
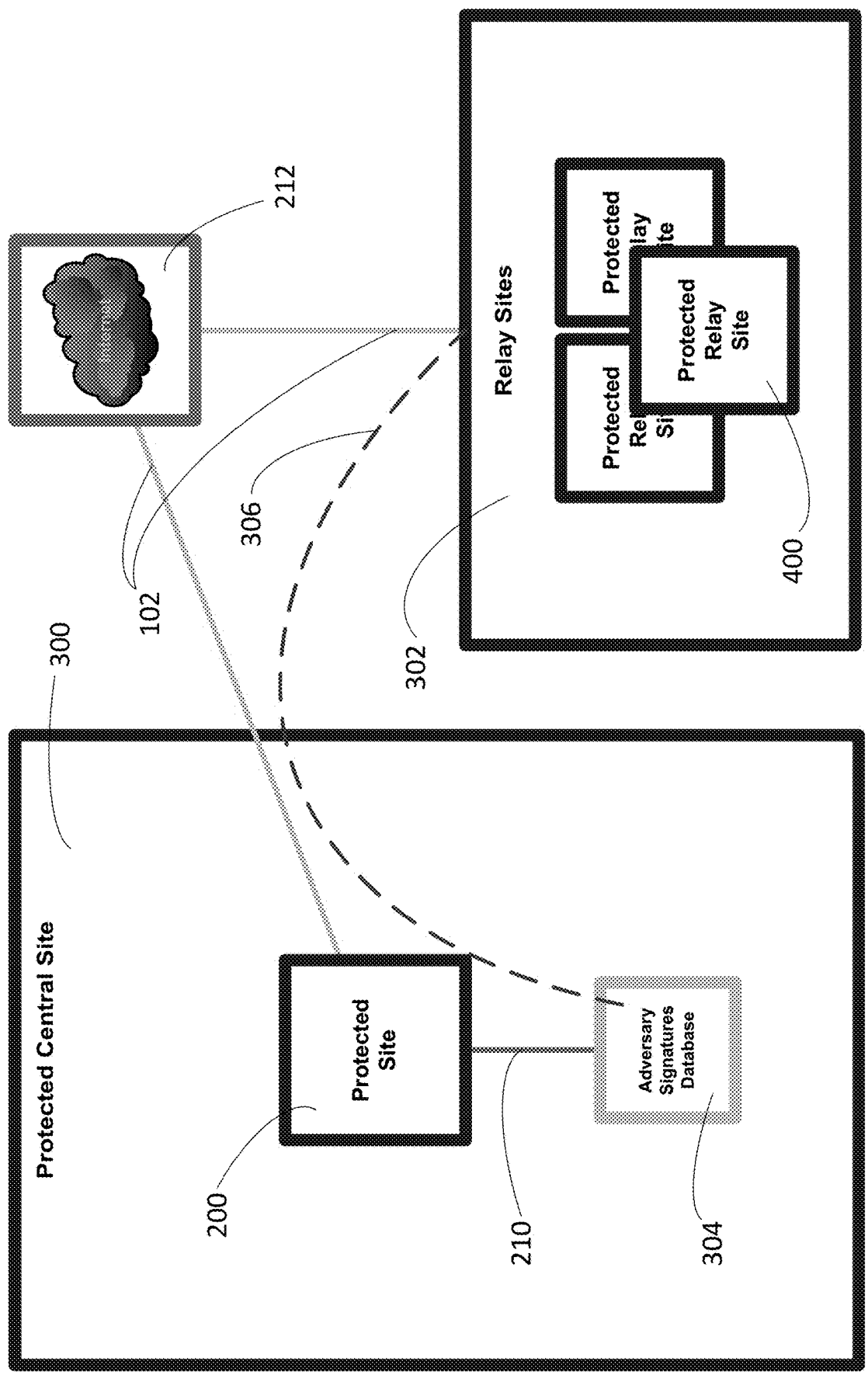
FIG. 3 is a logical view of the Protected Central Site and the Relay Sites according to an embodiment of the invention.

There are three different types of Protected Sites 200 in the SSN 100, which are defined as follows:

Protected Central Site 300—As shown in FIG. 3, this refers to the single Protected Site 200 which contains the Adversary Signatures Database 304, which is a storage repository containing all of the Adversary Attack Data 914 and associated Adversary Analytics Data 802 collected from all Relay Sites 402 and their Associated Tenant Sites 402 connected to the SSN 100. This site is responsible for distributing newly collected Adversary Attack Data 914 and associated Adversary Analytics Data 802 to the connected Relay Sites 402 and will contain the needed IT Infrastructure 216 to fulfill this responsibility. The Protected Central Site will contain a Sentinel Deployment 600 to help defend against potential Adversary 908 Cyberattacks 912 on the SSN 100 platform.

Figure 4:
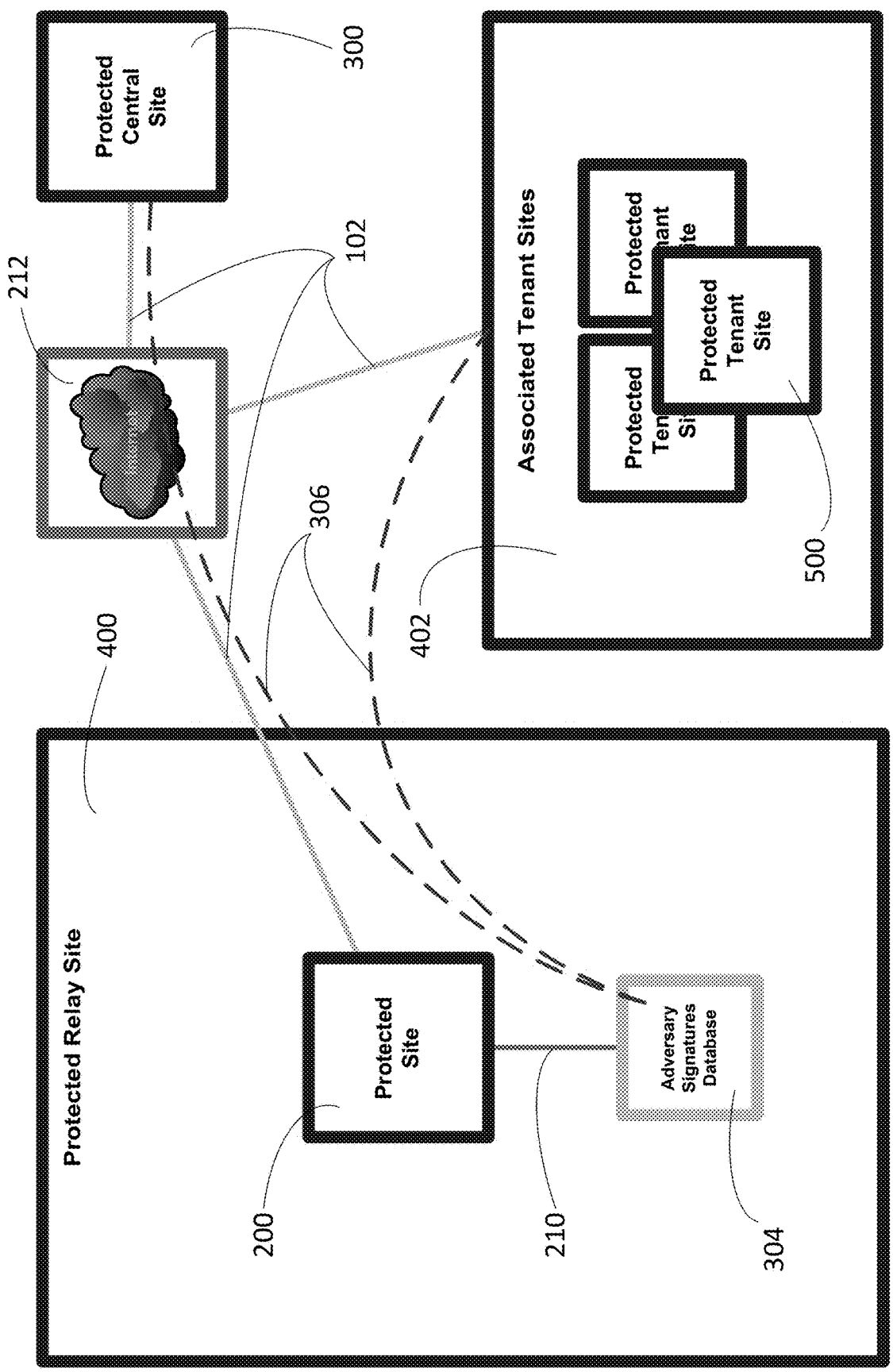
FIG. 4 is a logical view of the Protected Relay Site and the Associated Tenant Sites according to an embodiment of the invention.

Protected Relay Site 400—As shown on FIG. 4, these are Protected Sites 200 that are associated with an IT Service Providers who are associated with one of more Protected Tenant Sites 500, collectively referred to as Associated Tenant Sites 402, which are typically the IT Service Providers' customers. Each Protected Relay Site 400 will contain a copy of the Adversary Signatures Database 304. Each Protected Relay Site 400 will be responsible for distributing collected Adversary attack data and associated analytics to all of its Associated Tenant Sites 402 as well as to the Protected Central Site 300 and will contain the needed IT Infrastructure 216 to fulfill this responsibility. Each Protected Relay Site 400 will contain a Sentinel Deployment 600 to help defend against potential Adversary 908 Malicious Behavior/Cyberattacks 912 on the SSN 100 platform, the Protected Relay Site 400 itself, or its Associated Tenant Sites 402. Some examples of Protected Relay Sites 400 would be IT Managed Service Providers (MSPs), Value Added Resellers, or Cloud Hosting Providers.

Figure 5:
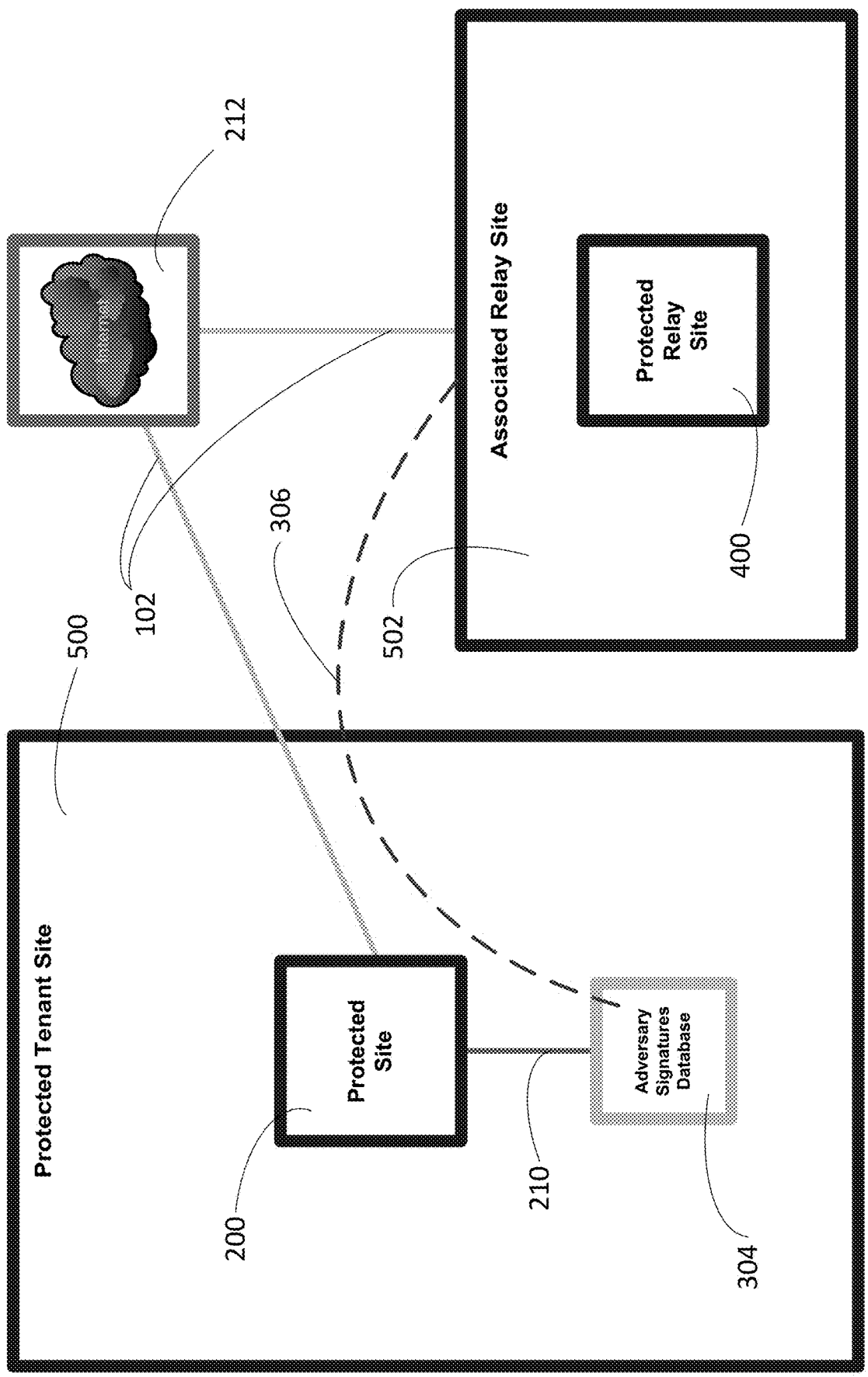
FIG. 5 is a logical view of the Protected Tenant Site and the Associated Relay Site according to an embodiment of the invention.

Protected Tenant Site 500—As shown on FIG. 5, these are Protected Sites that are associated with a single Defender 906. Multiple different Protected Tenant Sites 500 can be associated with the same Defender 906. Each Protected Tenant Site 500 will have a single Associated Relay Site 502. Each Protected Tenant Site 500 will contain a copy of the Adversary Signatures Database 304. Each Protected Tenant Site 500 will be responsible for distributing collected Adversary attack data and associated analytics from its Sentinel Deployment 600 to its Associated Relay Site 502 and will contain the needed IT Infrastructure 216 to fulfill this responsibility. Some examples of Protected Tenant Sites 500 would be a family's home network, a business with an HQ location & multiple remote locations, home offices of remote workers, or a small business in a single location.

As show on FIG. 6, each Sentinel Deployment 600 will be built using the following Hardware Components 610:

Computer Resources 612—This includes both computer processing power provided by one (1) or more Central Processing Units (CPUs) as well as a system to store information for immediate use in a computer provided by Random Access Memory (RAM). These are the basic building blocks of modern computer architecture, and they provide the needed resources for running software applications on a computer.

All Flash Storage 614—This refers to computer data storage whose recording media consists of one (1) or more Solid-State Drives (SSDs). SSDs are resistant to physical shock and have no moving parts, which greatly increases their reliability, as well as high performance data storage.

Networking Hardware 616—This refers to computer networking hardware provided by one (1) or more physical or virtual Network Interface Cards (NICs), which allows hardware associated with the Sentinel Deployment to have network connections 210 to the Protected Site's Local Networking Equipment 202.

Figure 7:
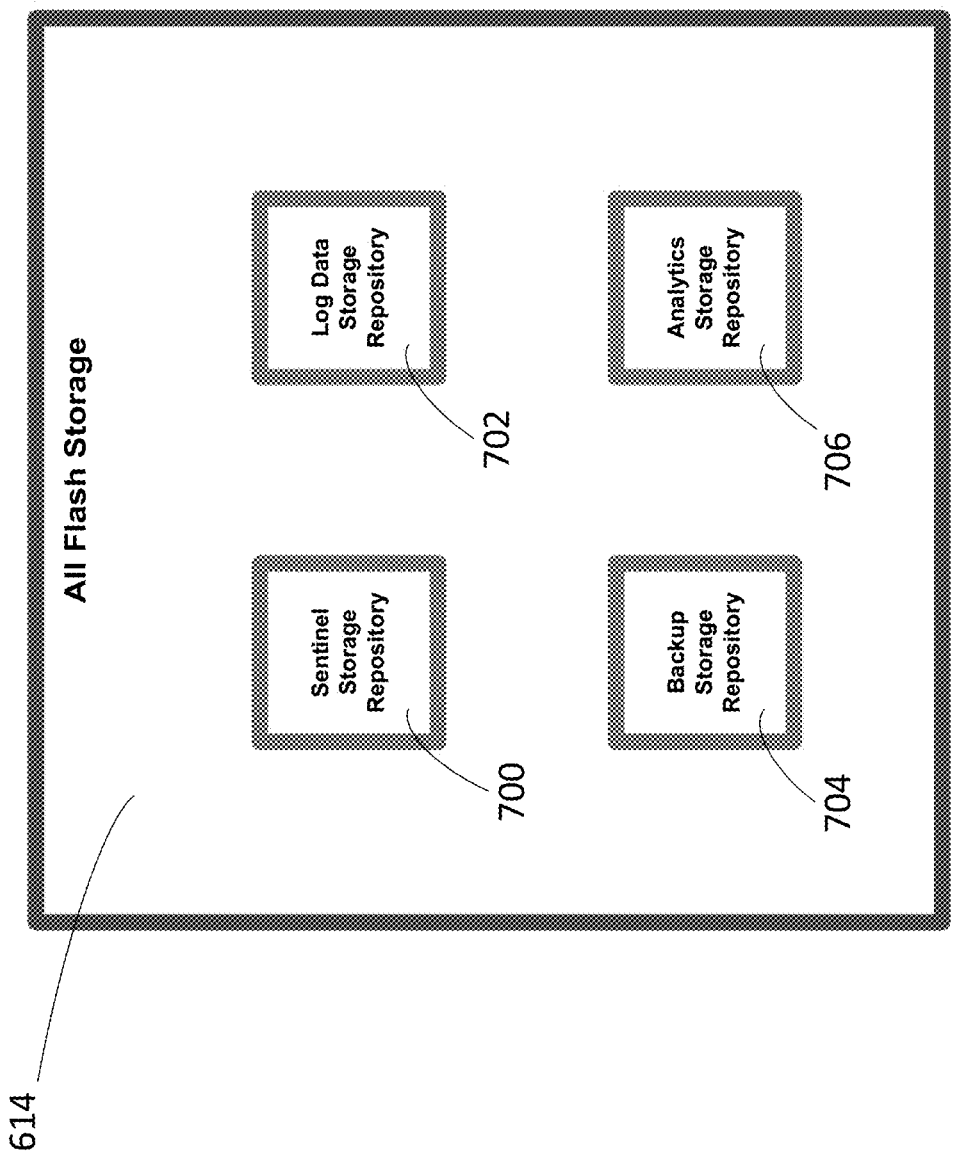
FIG. 7 is a logical view of the All-Flash Storage shown in FIG. 6 that depicts the different storage repositories needed to support each Sentinel Deployment according to an embodiment of the invention.

As shown on FIG. 7, each All Flash Storage 614 component must contain the following storage repositories:

Sentinel Storage Repository 700—This storage repository provides the needed data storage to the Sentinel Deployment's 600 Hardware Virtualization Software 622 and allows it to provision all of the deployed Baseline Sentinels 640 in a Sentinel Deployment 600. This storage repository will also provide any required data storage by the Hardware Virtualization Software 622 to provision new Warrior Sentinels 902 in an Active Sentinel Deployment.

Log Data Storage Repository 702—This storage repository provides the needed data storage for all log data that are generated by the Sentinel Deployment's 600 Software Modules 620.

Figure 8:
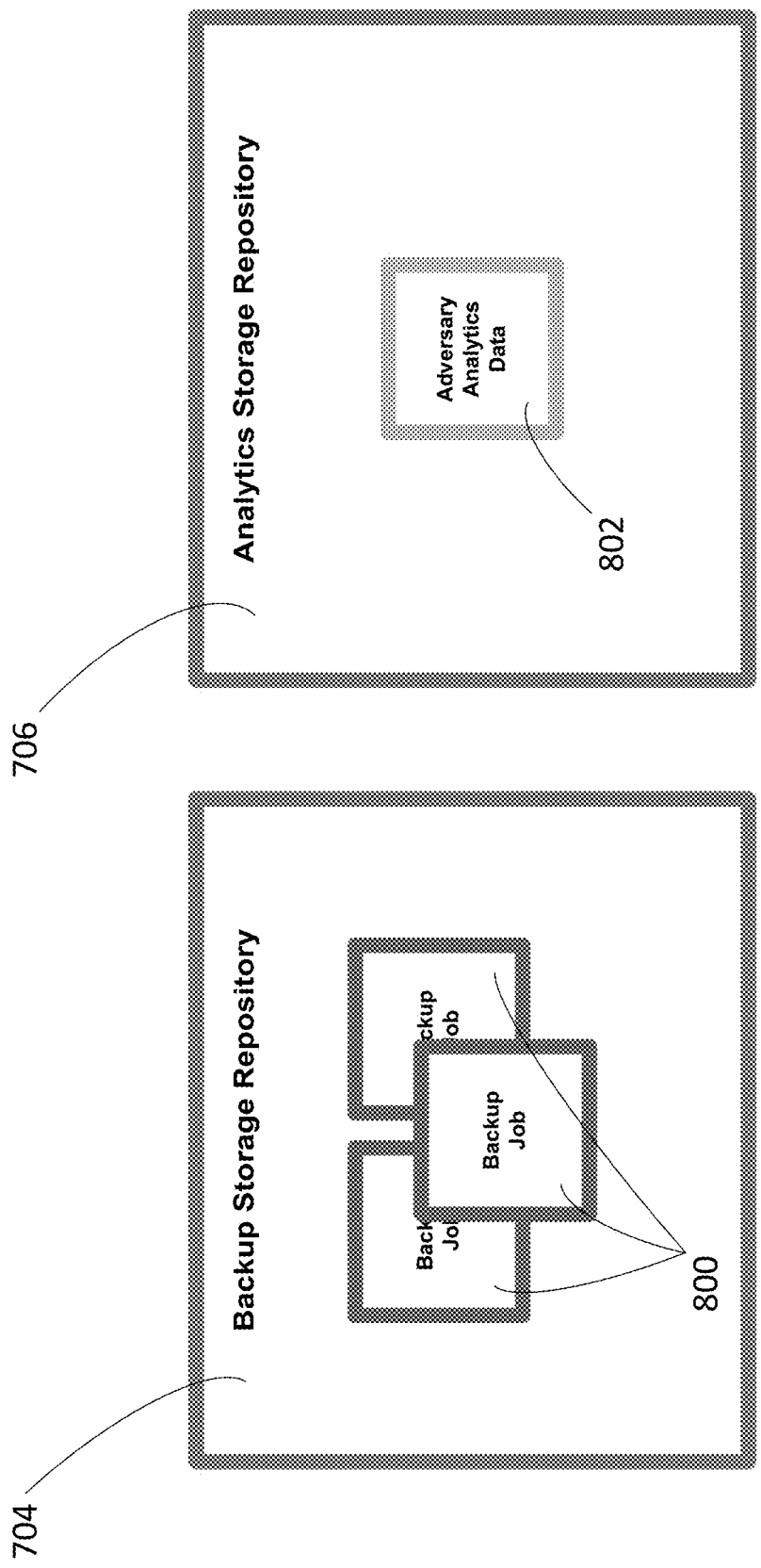
FIG. 8 is a logical view of storage repositories shown in FIG. 7 that depict the different data types that will be generated & stored in each Sentinel Deployment according to an embodiment of the invention.

Backup Storage Repository 704—As shown in FIG. 8, this storage repository provides the needed data storage for all of the Backup Jobs 800 created by the Sentinel Deployment's 600 Backup Software 626.

Analytics Storage Repository 706—As shown in FIG. 8, this storage repository provides the needed data storage for the Adversary Analytics Data 802 generated by the Sentinel Deployment's 600 Analytics Software 630.

The Hardware Components 610 for a Sentinel Deployment 600 can be provided by a single physical device, or by combining multiple different physical devices into a shared resource pool. As a rule, the more Baseline Sentinels 640 deployed in a given Sentinel Deployment 600, the more Hardware Components 610 that will be required to support that Sentinel Deployment 600.

Each Sentinel Deployment 600 will be built using the following Software Modules 620:

Hardware Virtualization Software 622—This software allows for the creation or "provisioning" of simulated computer environments, known as "virtual machines" (VMs). This software allows the Defender to abstract or "virtualize" physical Computer Resources 612, All Flash Storage 614, and Networking Hardware 616, and assign these virtual resources to support specific VMs.

Management Software 624—This software provides local and remote management capabilities for the hardware & software in a Sentinel Deployment 600. This can either be a single centralized management software solution or be provided by multiple different software applications.

Backup Software 626—This software allows the Defender 906 to create one or more supplementary copies of their computer data, referred to as Backup Jobs 706. These backups allow a Defender's 906 computer data to be rolled back or restored to a previous state.

Monitoring Software 628—This software will monitor all deployed Sentinels 642 and detect and log any attempt to interact or communicate with them. The software will be configured to send alerts to appropriate individuals, as defined by the Defender 906, when any Malicious Activity 912 is detected.

Analytics Software 630—This software will review all detected Malicious Activity 912 for meaningful patterns in the Adversary's 908 cyberattacks and will assist in the development of potential countermeasures to detected Malicious Activity 912. This new Adversary Analytics Data 802 will be distributed to all members of the SSN 100.

Communication Software 632—This software allows for communication between the different Sentinel Deployments 600 and will enable new Adversary Analytics Data 802 to be distributed to all other Protected Sites 200 connected to the SSN 100. It will also handle the delivery of all generated alerts by the Monitoring Software 628 to their intended recipient(s).

The required Software Modules 620 for a given Protected Site's 200 Sentinel Deployment 600 can be provided by a single software application, or by combining multiple different software applications to fulfill all the required functionality for each of the Software Modules 620.

The deployed Baseline Sentinels 640 in each Protected Site 200 will leverage multiple different designs and each Sentinel 642 will be individualized to appear to be legitimate parts of the Defender's 906 IT infrastructure 216. Some examples of this would be matching the Defender's 906 naming conventions, using similar device types to those deployed at the Protected Site 200, and using the same deployment practices as the Defender 906.

The Baseline Sentinels 640 will be deployed in a Protected Site's 200 IT Infrastructure 216 in such a way that so that normal and legitimate activity by Defender's 906 users will not result in any potential interactions with a Sentinel 642. A user would need to take multiple deliberate actions, which are contrary to the Defender's 906 acceptable use policy, before they would start encountering the Baseline Sentinels 640. This will reduce the instances of false positives involving the Sentinel Deployment 600 and provide Defenders 640 with a way to detect potential malicious insiders that are planning a Cyberattack 912 on a Defender's 906 Protected Site 200.

The most critical requirement for the Sentinel's 642 design is as follows: "Do no harm". While a Sentinels 642 must be configured to appear as vulnerable and desirable target to a potential Adversary 908, it must be impossible for an Adversary 908 to actually leverage any of the deployed Sentinels 642 to enable additional Cyberattacks 912 on the Defender's 906 Protected Site 200. A Sentinel 642 should never be deployed containing Important Data 218 whose release or theft by an Adversary 908 would cause harm to the Defender 906, the Defender's 906 users, or any other individuals & organizations that the Defender 906 interacts with.

Once all of the Baseline Sentinels 640 have been deployed at a Protected Site 200, the Sentinel Deployment's 600 Backup Software 626 will create a Backup Job for each Sentinel 642 to establish their baseline configuration. From that point onward, the Defender 906 will define any and all attempts to communicate, scan, modify, or interact in any way with the deployed Sentinels 642 as Malicious Activity 912, and the Monitoring Software 628 will be configured to detect that behavior. Sentinels 642 will never initiate communications with the Defender's 906 users or any other deployed IT Infrastructure 216 at the Defender's 906 Protected Site 200.

Figure 10:
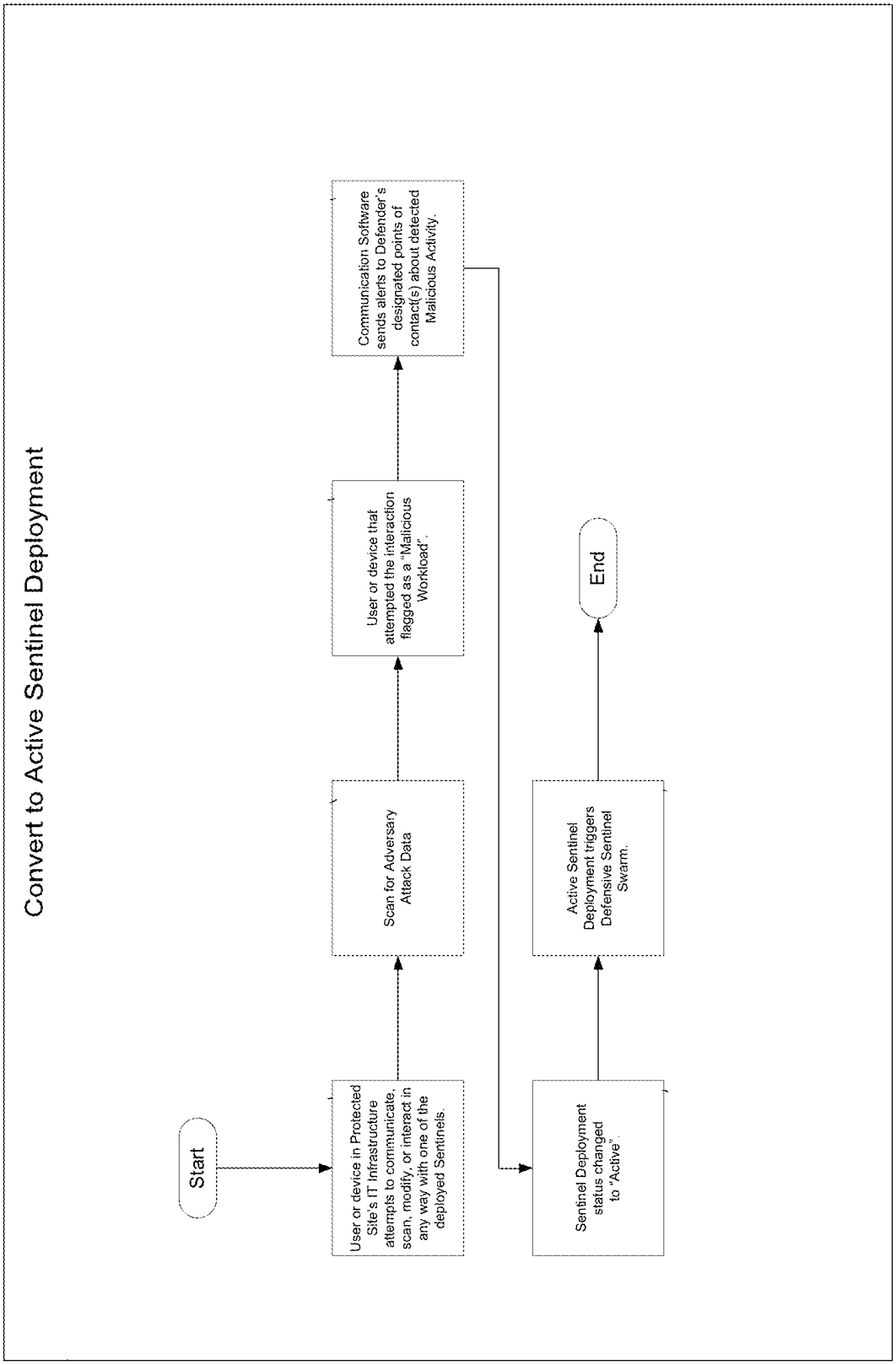
FIG. 10 is flow chart that shows the steps that a Sentinel Deployment takes to convert to an Active Sentinel Deployment according to an embodiment of the invention.

The Baseline Sentinels 640 are intended to coax detectable behavior from potential Adversaries 908 that have already penetrated the Defender's IT security infrastructure by providing them with appealing decoy targets for their Cyberattacks 912. Any attempt by a potential Adversaries 908 to communicate, scan, modify, or interact with any deployed Sentinel 642 will result in detectible behavior, like vibrations from a fly landing on a spider's web, that the Monitoring Software 628 has been configured to detect. As shown in FIG. 10, the occurrence of ANY detectible behavior by the Monitoring Software 628 within the Baseline Sentinels 640 at a Protected Site 200 will result in the Sentinel Deployment 600 automatically converting to an Active Sentinel Deployment 900 and its Communication Software 632 alerting the Defender 906 to the presence of an unknown number of malicious actors, currently within their IT infrastructure 216, and that their defenses have been compromised. The Adversary 908 on the other hand, would be unaware that the Defender 906 has been alerted to their presence.

The now-alerted Defender 906 would then use known strategies and tactics against the now-identified-but-unaware Adversary 908, based on an organization's Security Incident Response Plan for Malicious Actors. This plan should include the specific series of actions that the Defender 906 will take against the Adversary 908 once they have been detected. Defenders 906 must develop this plan as part of the Sentinel Deployment 600 if they do not already have one in place. A good example of computer defense tactics are the MITRE Active Defense Tactics, which may be found at https://shield.mitre.org/matrix/.

Figure 9:
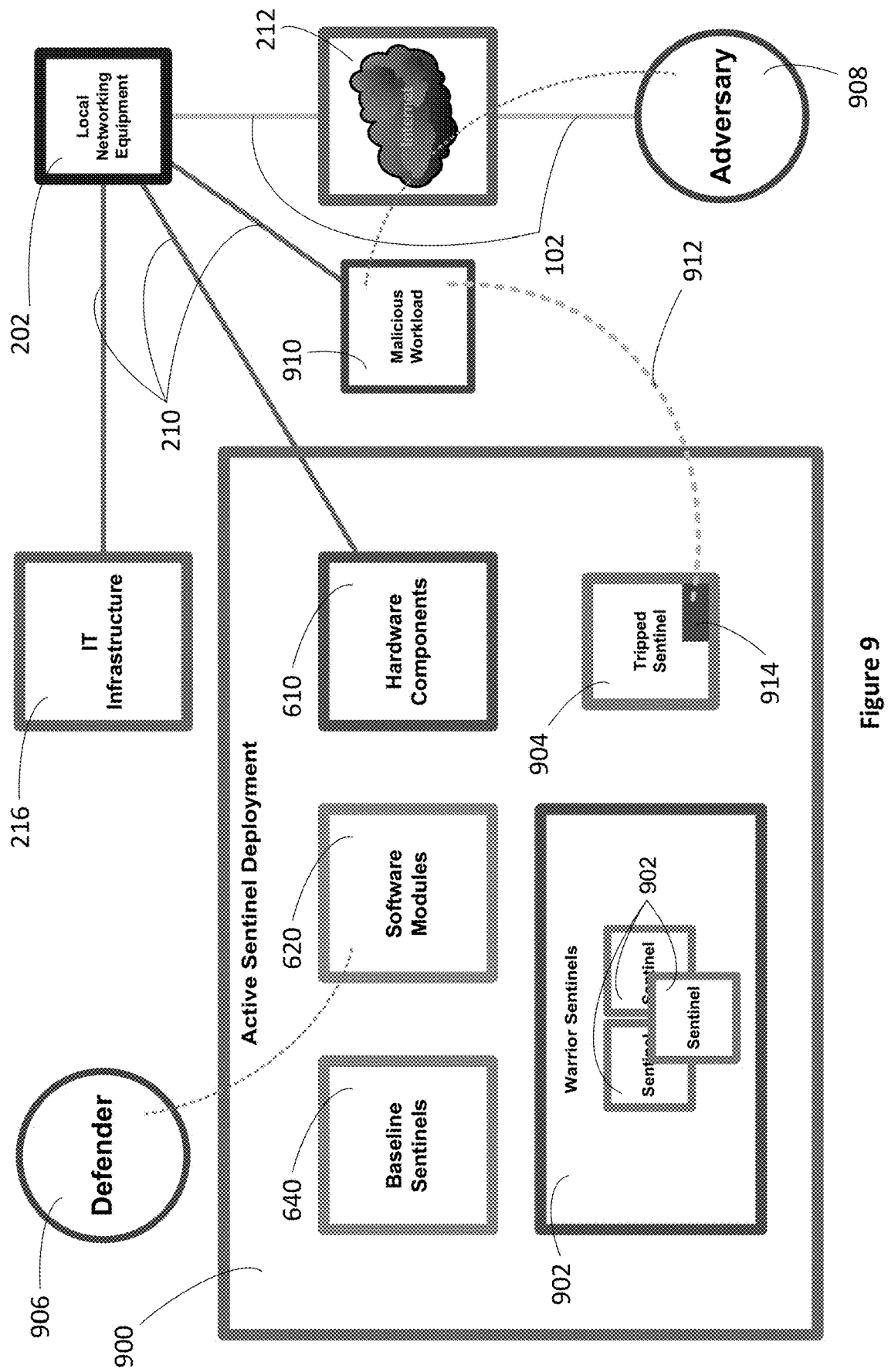
FIG. 9 is a logical view of a Sentinel Deployment shown in FIG. 2 that has been triggered by an Adversary according to an embodiment of the invention. This Sentinel Deployment is a representation of its Active state, with additional Warrior Sentinels deployed.
Figure 11:
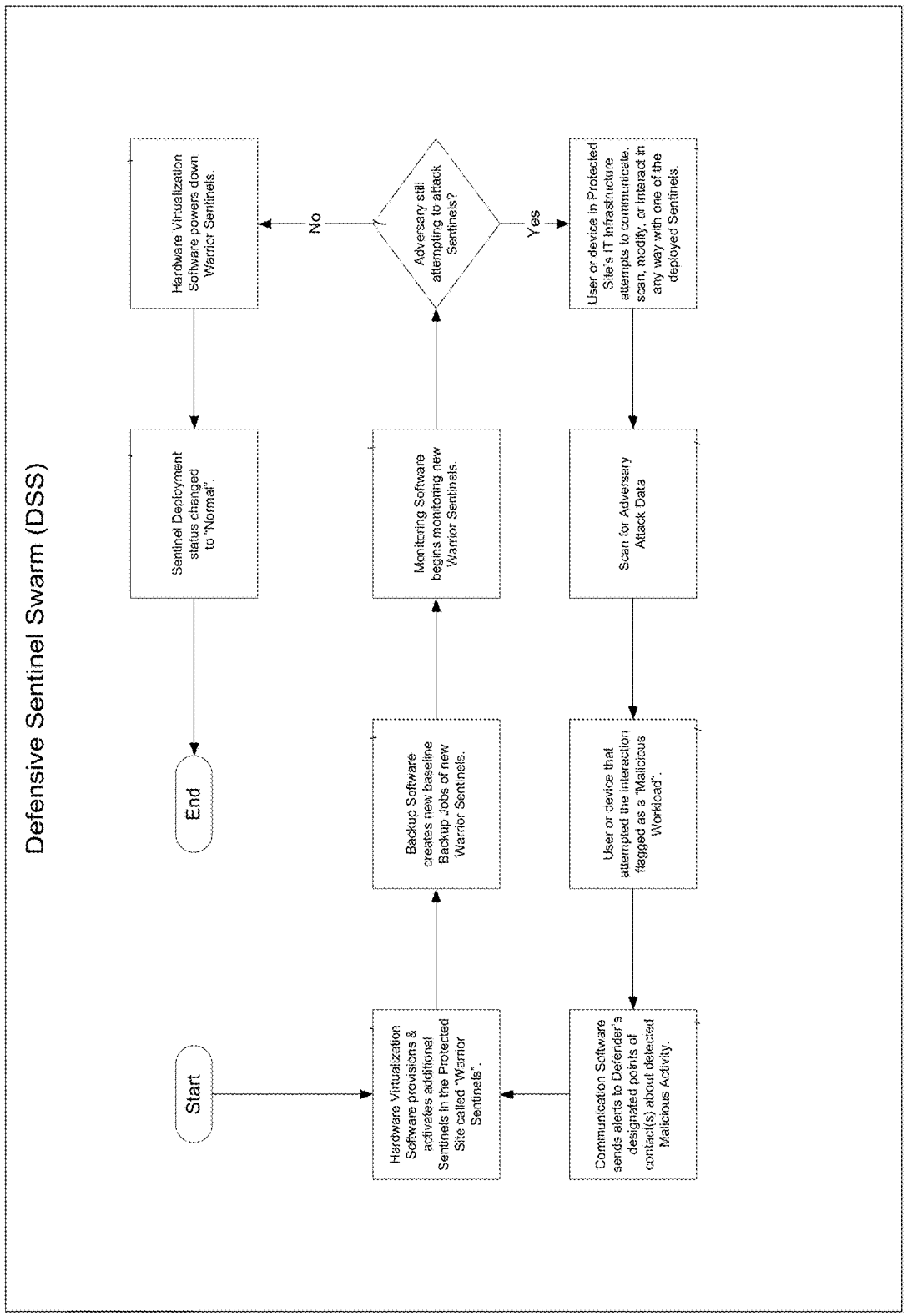
FIG. 11 is a flow chart that shows the steps that an Active Sentinel Deployment takes to trigger the Defensive Sentinel Swarm according to an embodiment of the invention.

As shown in FIG. 11 a new defensive tool that the Defender 906 will gain with an Active Sentinel Deployment 900 is referred to as the "Defensive Sentinel Swarm" (DSS). The DSS will be automatically triggered when a Sentinel Deployment 600 becomes an Active Sentinel Deployment 900 as shown on FIG. 9, and the Active Sentinel Deployment's 900 Hardware Virtualization Software 612 will begin to rapidly deploy large numbers of additional Sentinels 642, referred to as Warrior Sentinels 902, into all portions of the Protected Site's 200 IT Infrastructure 216. These new Warrior Sentinels 902 will join the Baseline Sentinels 640 and act as decoys and distractions for the Adversary 908 by giving them new potential "vulnerable" targets for their Cyberattacks 912 and draw the Adversary's 908 attention away from the Defender's 908 actual IT Infrastructure 216 and the Important Data 218.

Figure 12:
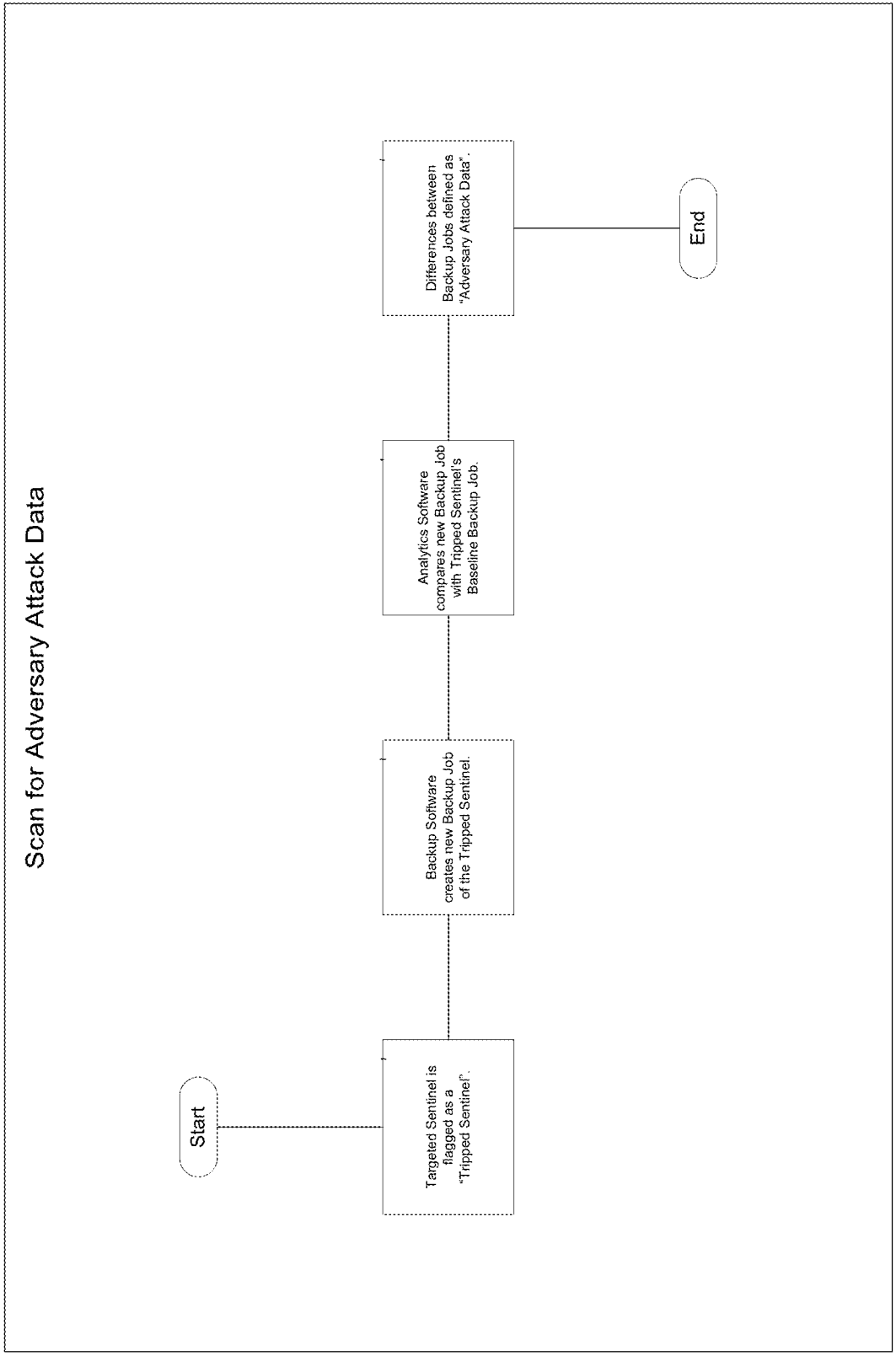
FIG. 12 is a flow chart that shows the steps that a Sentinel Deployment takes to scan for an Adversary's Attack Data according to an embodiment of the invention.

As the Adversary continues to target the Baseline Sentinels 640 and Warrior Sentinels 902 in the DSS, they will unwittingly be providing the Defender 906, and the larger SSN 100, with additional data on their Malicious Activities 912. As shown in FIG. 12, each that time that a given Sentinel 642 is the target of an Adversary 908 Cyberattack 912 the Backup Software 626 will create a new Backup Job 800 of that same Sentinel 642 and compare the new backup to the baseline. Any differences between the second backup and the original baseline backup will be the digital representation of the Adversary's 908 Malicious Activities 912, referred to as Adversary Attack Data 914.

The Analytics Software 630 in the Sentinel Deployment 600 will analyze this growing data set of Adversary Attack Data 914 and assist the Defender 906 with systematically identifying and tagging all of the Adversary's 908 Malicious Workloads 910, compromises, other and entry points back into the Protected Site 200. This will enable the Defender 906 to excise/remove the Adversary 908 from their IT Infrastructure 216 all at once, at a time of the Defender's 906 choosing.

As the DSS continues to run, the quantity and complexity of new Warrior Sentinels 902 that the Hardware Virtualization Software 612 provisions would continue to increase. This process will continue indefinitely until the Defender 906 has completely removed the Adversary 908 from their environment or until the Adversary 908 becomes unable or unwilling to persist in their attempts to attack the Defender 906. At that point, the Adversary's 908 breach of the Protected Site 200 will have been successfully countered, and the Defender 906 will have "won" the encounter.

Using the Management Software 624, the Defender 906 will then end the DSS and reset the Protected Site's 200 Active Sentinel Deployment 900 to be a standard Sentinel Deployment 600. This will cause the Warrior Sentinels 902 to be shut down, returning their associated hardware resources back into the available resource pool, and reduce the Sentinel Deployment's 600 Sentinel 642 population back to just the Baseline Sentinels 640. The Defender 906 would then update, modify, expand, and enhance their defenses in their IT Infrastructure 216 based on the results of the Analytics Software's 630 analysis of Adversary Attack Data 914 encountered by the Sentinels 642 during the breach, referred to as Adversary Analytics Data 802.

As shown on FIGS. 3-5, this Adversary Analytics Data 802 would then be sent by the Communication Software 632 to all other Protected Sites 200 connected to the SSN 100, so that all members of the SSN 100 will benefit from the overall improved security posture that results. The more that Adversaries 908 persist in attacking Protected Sites 200 connected to the SSN 100, the more Adversary Attack Data will be gathered and analyzed, and the more Adversary Analytics Data 802 will be generated and distributed to every member of the SSN 100.

Sentinel Deployments 600 would be configured and secured so that potential Adversaries 908 would be unable to prevent the Defenders 906 from arbitrarily increasing or decreasing the quantity, complexity, and location of the Sentinels 642 within the Protected Site 200, to levels of the Defender's 906 choosing, which matches the Defender's 906 current security posture and associated defensive strategy.

The invention claimed is:

1. A method for improving IT security in a computer network, comprising:
   a. Installing on a computer network a first Sentinel Node;
   b. Deploying from said first Sentinel Node a first Sentinel virtual decoy onto said computer network;
   c. Configuring said first Sentinel virtual decoy so that there is no legitimate reason for a computer, user, or device to communicate with said first Sentinel virtual decoy;
   d. Capturing from said first Sentinel virtual decoy, from said first Sentinel Node, a first baseline configuration of said first Sentinel virtual decoy;
   e. Monitoring said first Sentinel virtual decoy and said computer network, by said first Sentinel Node, for any attempts by computers, users, or devices connected to said computer network, to communicate with said first Sentinel virtual decoy;
   f. Detecting by said first Sentinel Node an attempt to communicate with said first Sentinel virtual decoy;
   g. Transmitting an alert message to at least one designated individual on said attempt to communicate with said first Sentinel virtual decoy;
   h. Capturing from said first Sentinel virtual decoy, from said first Sentinel Node, a second baseline configuration of said first Sentinel virtual decoy;
   i. Comparing said second baseline configuration of said first Sentinel virtual decoy to the first baseline configuration to measure any differences;
   j. Deploying a plurality of Warrior Sentinel virtual decoys from said first Sentinel Node onto said computer network;
   k. Configuring said plurality of Warrior Sentinel virtual decoys so that there is no legitimate reason for a computer, user, or device to communicate with said plurality of Warrior Sentinel virtual decoys;

l. Capturing from said plurality of Warrior Sentinel virtual decoys, from said first Sentinel Node, a first baseline configuration for each of said plurality of Warrior Sentinel virtual decoys;

m. Monitoring said plurality of Warrior Sentinel virtual decoys and said computer network, by said first Sentinel Node, for any attempts by computers, users, or devices connected to said computer network, to communicate with any one or more of said plurality of Warrior Sentinel virtual decoys;

n. Detecting by said first Sentinel Node an attempt to communicate with said one or more of said plurality of Warrior Sentinel virtual decoys;

o. Capturing from said one or more of said plurality of Warrior Sentinel virtual decoys, from said first Sentinel Node, a second baseline configuration of said one or more of said plurality of Warrior Sentinel virtual decoys;

p. Analyzing the changes to the first and second baseline configurations to identify the nature of malicious activity;

q. When said first Sentinel Node detects, after a predetermined time period, no additional attempts to communicate with said first Sentinel virtual decoy or with one or more of said plurality of Warrior Sentinel virtual decoys, removing by said first Sentinel Node one or more of said plurality of Warrior Sentinel virtual decoys, from said computer network.

2. A method, according to claim 1, further comprising r. Transmitting the analysis of the detected malicious activity with other Sentinel Deployments.

3. A method according to claim 1, wherein each said Sentinel virtual decoy and each said Warrior Sentinel virtual decoy is based on a Sentinel template which Sentinel template is based on information gathered from said computer network, including devices, accounts, software, and users connected to said computer network so that same Sentinel template, said Sentinel virtual decoys and said Warrior Sentinel virtual decoys appear to devices outside said computer network to be operating assets of said computer network.

4. An apparatus comprising:

a computer device installed on a computer network, said computer device comprising a processor and non-transitory storage media, said non-transitory storage media containing machine-readable instructions, which when executed by the processor, cause the computer device to:

a. Deploy a first Sentinel virtual decoy onto said computer network;

b. Configure said first Sentinel virtual decoy so that there is no legitimate reason for a computer, user, or device to communicate with said first Sentinel virtual decoy;

c. Capture from said first Sentinel virtual decoy, a first baseline configuration of said first Sentinel virtual decoy;

d. Monitor said first Sentinel virtual decoy and said computer network, for any attempts by computers, users, or devices connected to said computer network, to communicate with said first Sentinel virtual decoy;

e. Detect an attempt to communicate with said first Sentinel virtual decoy;

f. Transmit an alert message to at least one designated individual on said attempt to communicate with said first Sentinel virtual decoy;

g. Capture from said first Sentinel virtual decoy a second baseline configuration of said first Sentinel virtual decoy;

h. Compare said second baseline configuration of said first Sentinel virtual decoy to the first baseline configuration to measure any differences;

i. Deploy a plurality of Warrior Sentinel virtual decoys onto said computer network;

j. Configure said plurality of Warrior Sentinel virtual decoys so that there is no legitimate reason for a computer, user, or device to communicate with said plurality of Warrior Sentinel virtual decoys;

k. Capture from said plurality of Warrior Sentinel virtual decoys a first baseline configuration for each of said plurality of Warrior Sentinel virtual decoys;

l. Monitor said plurality of Warrior Sentinel virtual decoys and said computer network for any attempts by computers, users, or devices connected to said computer network, to communicate with any one or more of said plurality of Warrior Sentinel virtual decoys;

m. Detect an attempt to communicate with said one or more of said plurality of Warrior Sentinel virtual decoys;

n. Capture from said one or more of said plurality of Warrior Sentinel virtual decoys a second baseline configuration of said one or more of said plurality of Warrior Sentinel virtual decoys;

o. Analyze the changes to the first and second baseline configurations to identify the nature of malicious activity;

p. When said first Sentinel Node detects, after a predetermined time period, no additional attempts to communicate with said first Sentinel virtual decoy or with one or more of said plurality of Warrior Sentinel virtual decoys, removing by said first Sentinel Node one or more of said plurality of Warrior Sentinel virtual decoys, from said computer network.

* * * * *